(12) United States Patent
Haglof

(10) Patent No.: US 9,803,386 B2
(45) Date of Patent: Oct. 31, 2017

(54) WIND SHIELD

(71) Applicant: Ingvar Haglof, Langsele (SE)

(72) Inventor: Ingvar Haglof, Langsele (SE)

( * ) Notice: Subject to any disclaimer, the term of this patent is extended or adjusted under 35 U.S.C. 154(b) by 0 days.

(21) Appl. No.: 15/176,218

(22) Filed: Jun. 8, 2016

(65) Prior Publication Data

US 2016/0356056 A1 Dec. 8, 2016

(30) Foreign Application Priority Data

Jun. 8, 2015 (SE) ........................ 1550752

(51) Int. Cl.
*E04H 15/00* (2006.01)
*A01K 97/01* (2006.01)
*E04B 1/343* (2006.01)

(52) U.S. Cl.
CPC ........... *E04H 15/001* (2013.01); *A01K 97/01* (2013.01); *E04B 1/34357* (2013.01); *E04H 15/008* (2013.01)

(58) Field of Classification Search
CPC .... A01K 97/01; E04B 1/34357; E04H 15/001
USPC ....................................................... 135/117
See application file for complete search history.

(56) References Cited

U.S. PATENT DOCUMENTS

| | | | | | |
|---|---|---|---|---|---|
| 3,173,436 | A | * | 3/1965 | Peters | A01K 97/01 135/100 |
| 3,854,746 | A | * | 12/1974 | Flynn | B62B 13/16 135/115 |
| 4,064,662 | A | * | 12/1977 | O'Toole | E04B 1/34357 135/115 |
| 4,526,391 | A | * | 7/1985 | Winkelman | E04H 1/1205 135/87 |
| 7,743,781 | B2 | * | 6/2010 | Slaughter | A01M 31/025 135/117 |
| 8,429,858 | B1 | * | 4/2013 | Robinson | E04H 1/005 135/159 |
| 2004/0255526 | A1 | * | 12/2004 | Tremblay | A01K 97/01 52/79.5 |
| 2007/0033854 | A1 | * | 2/2007 | Ridge | E04H 15/001 43/1 |
| 2008/0295876 | A1 | * | 12/2008 | Ouellette | A01K 97/01 135/87 |
| 2012/0211042 | A1 | * | 8/2012 | Richter | E04H 15/001 135/143 |
| 2016/0279533 | A1 | * | 9/2016 | McInerney | E04H 15/001 |

* cited by examiner

*Primary Examiner* — Noah Chandler Hawk
(74) *Attorney, Agent, or Firm* — Young & Thompson

(57) ABSTRACT

The wind shield includes a roof section, two wall members placed at an angle to each other and that undergo a transition into two parallel wall members. The wind shield is open on the side opposite to the wall members positioned at an angle, and has an unbroken bottom except for an indentation extending inwards from the rear, open side of the wind shield. A board extends vertically upwards from the bottom, a wall component at the lower part of the open side is fixed at the board in a jointed manner to a first of the parallel wall members and the free end of the wall component may be attached to the board at the second parallel wall member, a tongue, parallel to the bottom, protrudes from the wall component and covers the indentation when the wall component is in its retracted condition relative to the wind shield.

12 Claims, 4 Drawing Sheets

WIND SHIELD

FIELD OF THE INVENTION

The present invention relates to a wind shield.

BACKGROUND OF THE INVENTION

When fishing through ice and when hunting, the practitioner sits stationary by an ice-fishing hole or occupies a hunting stand.

It is not seldom that the wind blows across iced bodies of water, since nothing is present to mitigate the wind.

It is generally known that what is known as the "wind-chill effect" causes the practitioner to experience a temperature that is significantly lower than the actual temperature. This means that it is not seldom the case that the fisher feels cold, even though he or she is wearing clothes that are appropriate for the purpose.

One problem that arises during ice fishing is that the ice-fishing hole is to be drilled into the ice and placed such that it is located inside of the wind shield. It is appropriate that the wind shield has a height that is suited to the fisher sitting inside the wind shield on a stool or equivalent. A greater height will, of course, provide a greater wind barrier. One problem is that the fisher cannot drill a hole in the ice while standing inside the wind shield, because this has a height that is too low. A second problem is that, in the case in which the fisher drills a hole inside the wind shield, the ice slush that is the result of the drilling operation will remain inside the wind shield and there freeze to ice.

SUMMARY OF THE INVENTION

The present invention solves these problems.

The present invention thus relates to a wind shield arranged for a user in the form of an ice fisher, and is characterised in that the wind shield comprises two wall members that are placed at an angle to each other and that undergo a transition into two wall members that are parallel to each other, in that the wind shield is open on the side that is opposite to the wall members that are positioned at an angle to each other, in that the wind shield has a bottom that is unbroken except for an indentation that extends inwards from the rear, open side of the wind shield, in that a board is present that extends vertically upwards from the bottom of the wind shield, in that a wall component is present at the lower part of the open side, in that the said wall component is fixed at the board in a jointed manner to a first of the said parallel wall members by means of a hinge and where the free end of the wall component may be attached to the board at a second of the said parallel wall members, in that a tongue that protrudes from the said wall component is present, which tongue is parallel to the bottom of the wind shield and covers the said indentation when the wall component is in its retracted condition relative to the wind shield, in that the wind shield is provided with a roof section, and in that the wind shield is provided with a jointed coupling arrangement in order to couple the wind shield to a draw vehicle or to a person during transport of the wind shield.

BRIEF DESCRIPTION OF THE DRAWINGS

The invention will be described in more detail below, partly in association with an embodiment of the invention shown in the attached drawings, where.

DETAILED DESCRIPTION OF THE INVENTION

Figure 1:
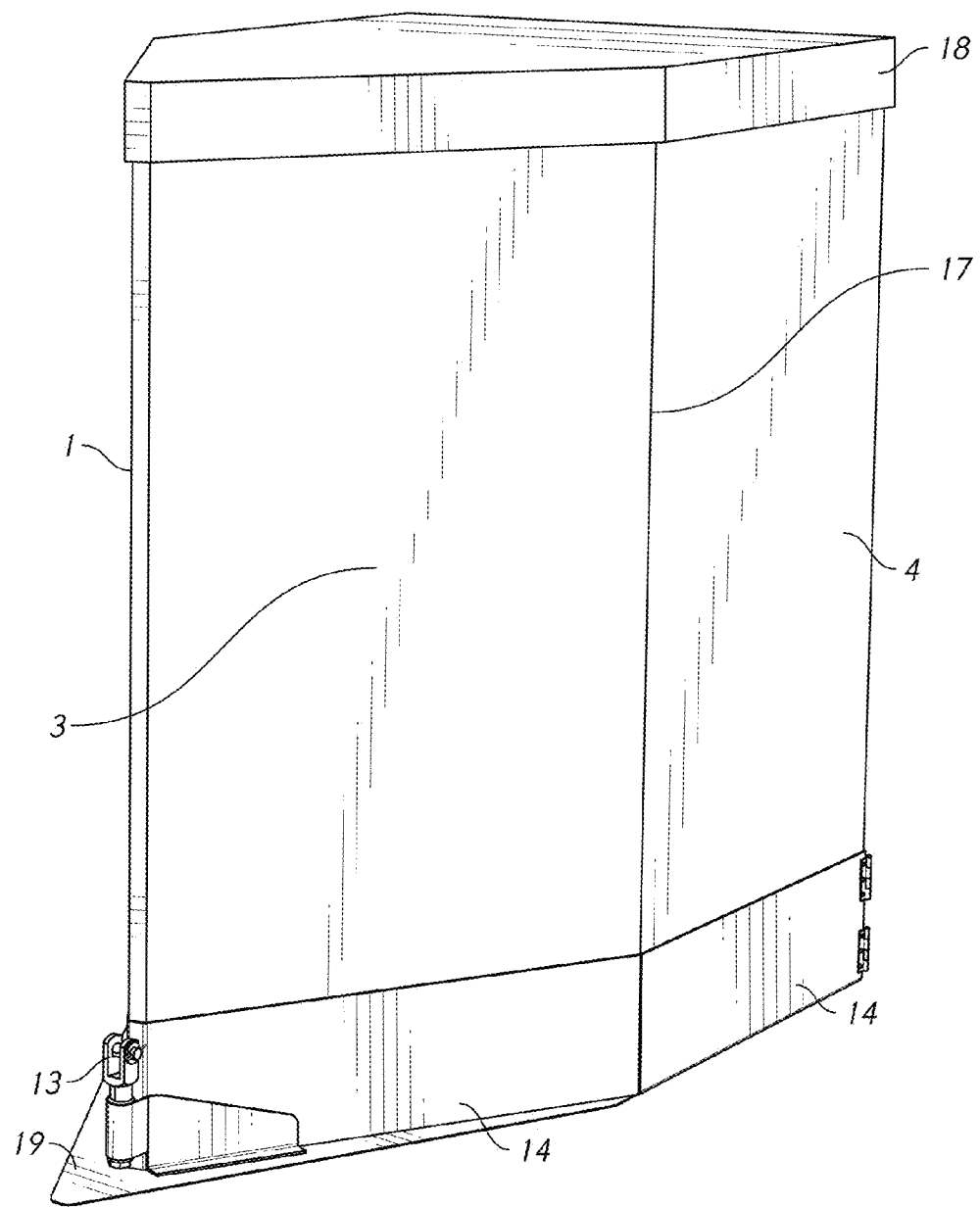
FIG. 1 shows the wind shield in a perspective view

FIG. 1 displays a wind shield 1 arranged for a user in the form of an ice fisher.

According to the invention, the wind shield 1 comprises two wall members 2, 3 that are placed at an angle to each other and that undergo a transition into two wall members 4 and 5, respectively, that are parallel to each other. The wind shield 1 is open on the side that is opposite to the wall members positioned at an angle to each other, as is made clear by FIGS. 3 and 4.

The wind shield has, in addition, a bottom 6 that is unbroken except for an indentation 7 that extends inwards from the rear, open side of the wind shield. A board 14 that extends upwards from the bottom is present.

A rear wall component 8 is present at the lower part of the open side 9. The said wall component 8 is fixed at the board 14 in a jointed manner to a first 4 of the said parallel wall members by means of a hinge 10, and where the free end of the wall component 8 may be attached to the board 14 at a second 5 of the said parallel wall members by attachment means 11.

A tongue 12 that protrudes from the said wall component 8 is present, which tongue is parallel to the bottom 6 of the wind shield and covers the said indentation 7 when the wall component 8 is in its retracted condition relative to the wind shield.

It is appropriate that the tongue 12 passes in over the floor 6.

The wind shield has also a roof section 18.

Furthermore, the wind shield is provided with a jointed coupling arrangement 13 in order to couple the wind shield to a draw vehicle, such as a snowmobile, or to a person during transport of the wind shield.

The board 14 extends upwards from the bottom 6 and at which the wall members of the wind shield are attached by appropriate fastening arrangements 15. The fastening arrangements 15 may be wing nuts that extend through the fastening arrangements denoted by 15 and the wall members, or other appropriate fastening arrangements.

According to one preferred design, the floor 6 of the wind shield and the said wall component 8 are manufactured from lightweight sheet metal or plastic.

As is made clear by FIG. 1, a forwards-directed tongue 19 that extends from the bottom 6 is present. This tongue 19 may be folded upwards in order to reduce the tensile force required if the ice is covered by snow.

Figure 2:
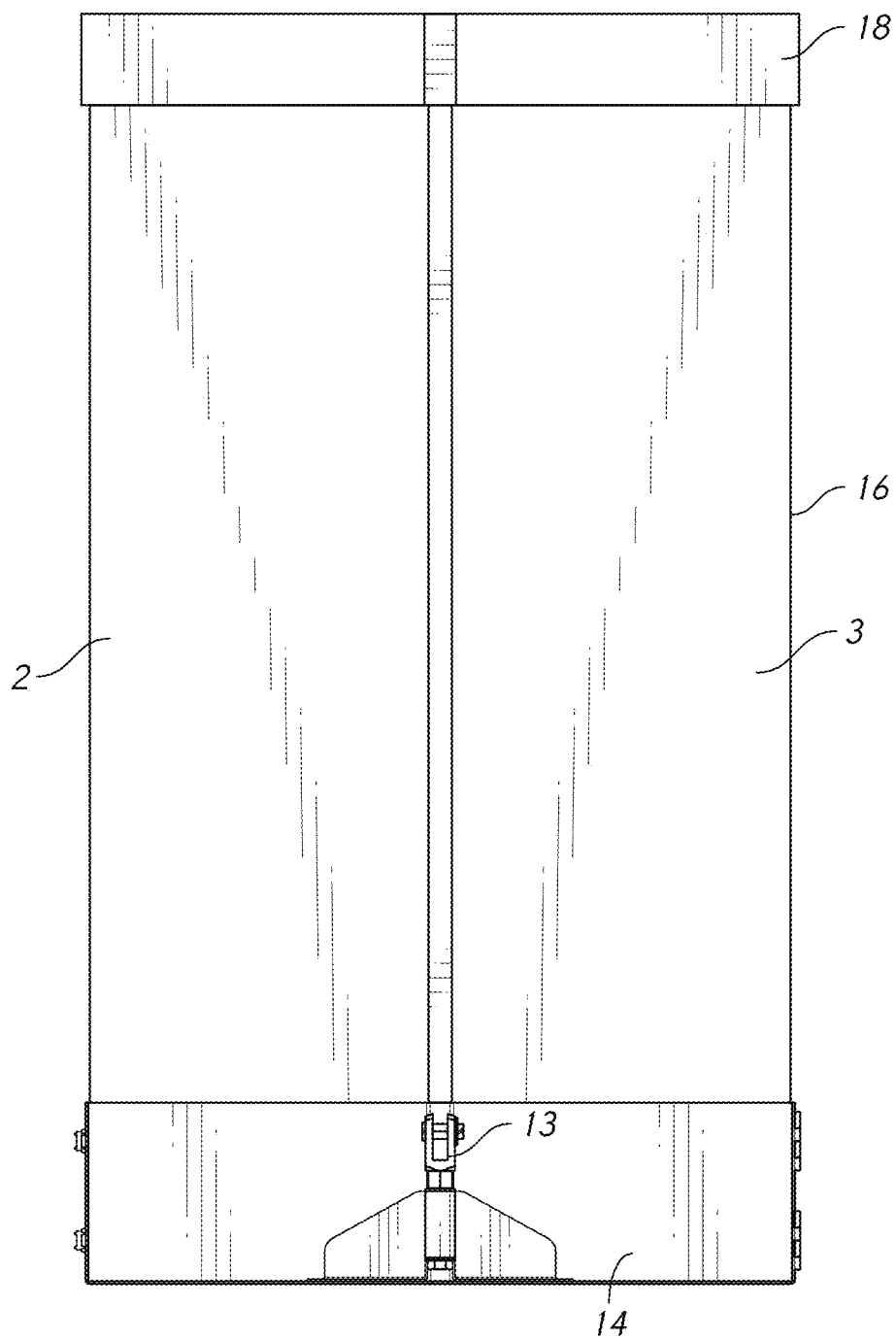
FIG. 2 shows the wind shield in a view from the front, from the left of FIG. 1.
Figure 3:
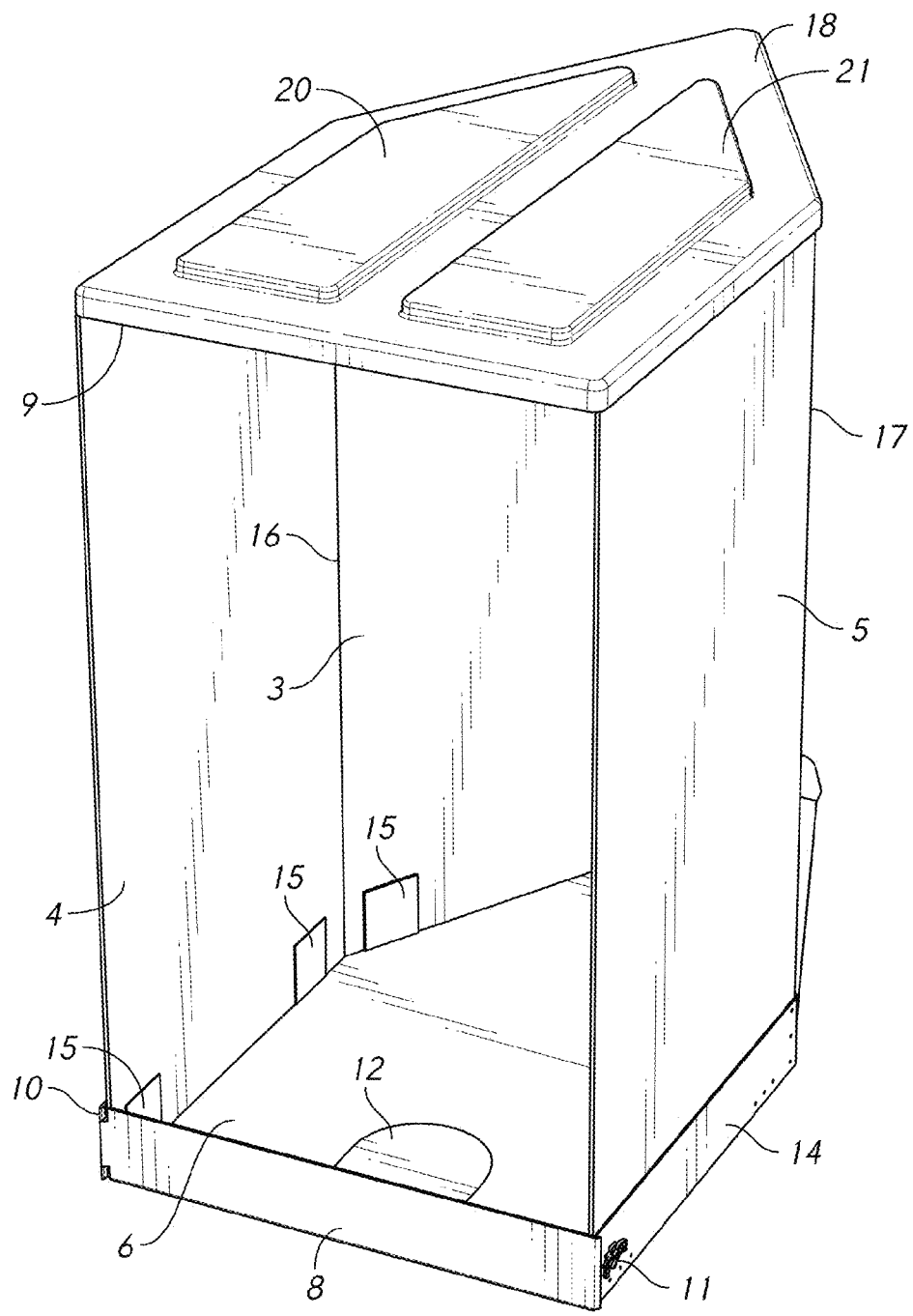
FIG. 3 shows the wind shield obliquely from the rear with a rear wall component in a retracted condition.
Figure 4:
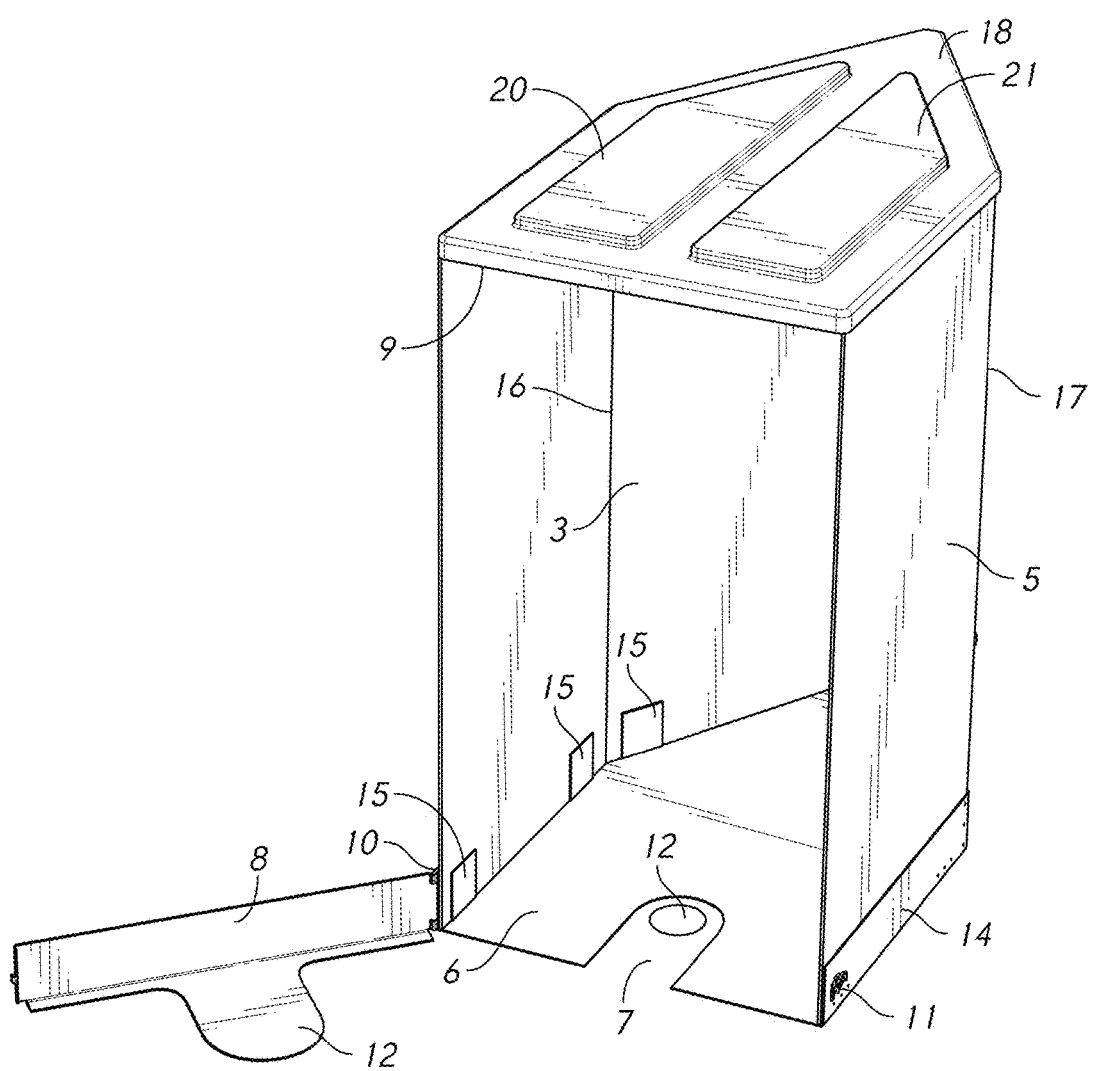
FIG. 4 shows the wind shield obliquely from the rear with a rear wall component in an opened condition.

The said roof section 18 is constituted by a separate piece of material. The roof section 18 may be constructed to be flat, as is shown in FIGS. 1 and 2, or it may be constructed with reinforcing elevations 20, 21, as is shown in FIGS. 3 and 4.

According to one preferred embodiment, the wall members are manufactured from paperboard, preferably plastic-coated paperboard.

According to one preferred embodiment, the walls 2, 3, 4, 5 of the wind shield are manufactured from one and the same piece of material, where the boundary between two neighbouring sides is constituted by folds 16, 17. This means that it is easy to release the wind shield from the bottom 6 and fold it.

It is preferred that the wall members 2, 3 that are set at an angle to each other form an angle to each other of 120 degrees to 60 degrees.

It is further preferred that the parallel wall members 4, 5 of the wind shield have a width of 50 to 75 cm.

Furthermore, it is preferred that the wall members 2, 3, 4, 5 of the wind shield have a height of 80-150 cm.

The wind shield is deployed such that the wind blows from the left in FIG. 1. Since the wind impacts onto the wall members 2, 3 that are set at an angle to each other, the wind shield withstands a surprisingly strong wind without being blown down or blown away.

When the wind shield has been deployed, the rear wall component 8 is rotated out such that the indentation 7 becomes visible. The location at which the hole is to be drilled is subsequently marked. A mark 22 is shown in FIG. 4. The wind shield is subsequently rotated to the side, around the coupling arrangement 13, to a position outside of the mark for the hole. A hole is drilled and ice slush is drawn up onto the ice. The wind shield is subsequently rotated back to its original position, whereby the ice slush is drawn to the side, and the indentation becomes located around the hole that has been drilled.

Thus, the present invention solves the problems described in the introduction.

A number of embodiments have been described above. It is, however, possible for one skilled in the arts to modify the design of details of the wind shield.

Thus, the present invention is not to be considered to be limited to the embodiments specified above: it can be varied within the scope specified by the attached patent claims.

The invention claimed is:

1. A wind shield arranged for a user in the form of an ice fisher, wherein the wind shield (1) comprises two first wall members (2, 3) that are placed at an angle to each other and that undergo a transition into two second wall members (4, 5), respectively, that are parallel to each other, the wind shield is open on the side that is opposite to the first wall members (2, 3) that are positioned at an angle to each other, forming an open side, the wind shield has a bottom (6) that is unbroken except for an indentation (7) that extends inwards from said open side of the wind shield, a board (14) is present that extends vertically upwards from the bottom (6) of the wind shield, a wall component (8) is present at the lower part of the open side, said wall component (8) being fixed at the board (14) in a jointed manner to a first (4) of the said parallel wall members by means of a hinge (10) and where the free end of the wall component may be attached to the board at a second (5) of the said parallel wall members, a tongue (12) that protrudes from the wall component (8) is present, which tongue is parallel to the bottom (6) of the wind shield and covers the indentation (7) when the wall component is attached to the board at the second of the said parallel wall members, the wind shield is provided with a roof section (18), and the wind shield is provided with a jointed coupling arrangement (13) in order to couple the wind shield to a draw vehicle or to a person during transport of the wind shield.

2. The wind shield according to claim 1, wherein the floor (6) of the wind shield and the said wall component are manufactured from lightweight sheet metal or plastic.

3. The wind shield according to claim 2, wherein the first and second wall members (2-5) of the wind shield are manufactured from one and the same piece of material, where the boundary between two neighbouring sides is constituted by folds (16, 17).

4. The wind shield according to claim 2, wherein the roof section (18) is constituted by a separate piece of material.

5. The wind shield according to claim 2, wherein the first and second wall members are manufactured of paperboard.

6. The wind shield according to claim 2, wherein the first wall members (2, 3) that are set at an angle to each other form an angle to each other of 120 degrees to 60 degrees.

7. The wind shield according to claim 1, wherein the first and second wall members (2-5) of the wind shield are manufactured from one and the same piece of material, where the boundary between two neighbouring sides is constituted by folds (16, 17).

8. The wind shield according to claim 1, wherein the roof section (18) is constituted by a separate piece of material.

9. The wind shield according to claim 1, wherein the first and second wall members are manufactured of paperboard.

10. The wind shield according to claim 1, wherein the first wall members (2, 3) that are set at an angle to each other form an angle to each other of 120 degrees to 60 degrees.

11. The wind shield according to claim 1, wherein the parallel second wall members (4, 5) of the wind shield have a width of 50 to 75 cm.

12. The wind shield according to claim 11, wherein the first and second wall members (2-5) of the wind shield have a height of 80-150 cm.

\* \* \* \* \*